United States Patent Office 3,246,034
Patented Apr. 12, 1966

3,246,034
BROMINATION OF SALICYLANILIDE
Theodore E. Majewski, Midland, Mich., assignor to The Dow Chemical Company, Midland, Mich., a corporation of Delaware
No Drawing. Filed July 20, 1964, Ser. No. 383,921
10 Claims. (Cl. 260—559)

This is a continuation-in-part of my application Serial Number 191,737, filed May 2, 1962, and now abandoned.

This invention relates to a novel process for the bromination of salicylanilide. More particularly, this invention involves the bromination of salicylanilide in an aromatic hydrocarbon-alkanol medium to produce a mixture rich in 3,4′,-5-tribromosalicylanilide.

A number of methods have been proposed for the bromination of salicylanilide with bromine. Common reaction media used in these methods are alcohol, water, and mixtures thereof. The use of such reaction media usually results in a product mixture having generally less than about 86 percent 3,4′,5-tribromosalicylanilide.

It has now been discovered that when bromination is carried out in a reaction medium of an appropriate aromatic hydrocarbon and an appropriate alkanol, a product mixture having as much as 99+ percent 3,4′,5-tribromosalicylanilide may be produced.

The method of this invention may be started by mixing salicylanilide with an appropriate aromatic hydrocarbon, an appropriate alkanol, and optionally, water. Water may be present in any amount not inconsistent with volume and handling considerations. The reaction mixture thus formed is then heated to the desired reaction temperature and bromine is added in the desired amount, reaction temperature being maintained until reaction is substantially complete. Optionally, the reaction may be carried out in two or more steps, as by heating the reaction mixture to a desired temperature for a period of time, then raising or lowering the temperature, as desired, for a further period of time. When reaction is substantially complete, the mixture is cooled, and then the product mixture of brominated salicylanilide is removed from the reaction medium as by filtering. The solid product may then be washed and dried if desired.

For best results, reactants are preferably added in a ratio of about three moles of bromine per mole of salicylanilide. Ratios of from about two and one-half moles of bromine per mole of salicylanilide to about three and one-half moles of bromine per mole of salicylanilide are operable.

Appropriate aromatic hydrocarbons useful in the process of the present invention are benzene, chlorobenzene, o-dichlorobenzene, and mixtures thereof. Appropriate alkanols are the simple unsubstituted aliphatic alcohols containing from one to four carbon atoms, such as methyl alcohol, ethyl alcohol, propyl alcohol, isopropyl alcohol, butyl alcohol, isobutyl alcohol, sec-butyl alcohol, and the like.

Reaction media useful in the process of the present invention may contain from about 0.3 to about 10 times, by weight, as much aromatic hydrocarbon as alkanol. Generally reaction media contain from about 3 to about 10 and preferably from about 4 to about 8 times, by weight, as much aromatic hydrocarbon as alkanol. As hereinbefore stated, water may also be present in the reaction media of the present invention.

Under certain circumstances, it is desirable to maintain 4′,5-dibromosalicylanilide in the product below about 0.8 percent by weight. When such minimization of 4′,5-dibromosalicylanilide in the product is desired, a reaction medium containing from about 0.3 to about 3 times, by weight, as much aromatic hydrocarbon as alkanol is operable, with a reaction medium containing from about 1 to about 3 times, by weight, as much aromatic as alkanol is preferred.

Reaction temperatures at which the process of this invention is operable may range from about 50 to about 80 degrees centigrade. Appropriate reaction time may be from about one hour to about five hours.

As reaction progresses, the reaction mixture tends to thicken. This is due to the low solubility of the brominated reaction products. It is desirable that the reaction mixture be easily stirrable throughout the reaction time in order that bromination progress at a reasonable rate. Thus it may be seen that the amount of reaction medium to be used is that which will result in an easily stirrable final product mixture. Generally, reaction medium in an amount, by weight, of about five times the weight of salicylanilide to be brominated is adequate. Lesser amounts may be used with somewhat longer reaction times. Greater amounts may be used without deleterious effect and may even be desirable in some situations. Large excesses shoud be avoided as wasteful and uneconomical.

Washing of the reaction product, if desired, may be accomplished by use of portions of the pure reaction medium, and then water. Drying may be carried out at slightly elevated temperatures, as, for example, about 85 degrees centigrade.

Salicylanilide is generally produced by condensing salicylic acid and aniline in a proper aromatic hydrocarbon reaction medium, such as chlorobenzene and the like. Salicylanilide is then separated from the reaction medium as by steam distillation. Bromination of salicylanilide may then be accomplished by any one of several methods.

As a further advantage of the present invention, the costly steam distillation separation step between production and bromination may now be eliminated. With agitation, water may be added to the product mixture of salicylanilide and aromatic hydrocarbon after condensation. The mixture thus formed may then be filtered and the impurity containing water layer removed as by decanting. Vacuum distillation may be employed after removal of the water layer, if desired, to reduce the volume of the aromatic hydrocarbon layer. To the aromatic hydrocarbon layer containing salicylanilide are added an appropriate alkanol and then bromine in accordance with the present invention. Thus, it is readily seen that the method of the present invention is easily adaptable to at least one well known method of making salicylanilide.

The product mixture of the process of the present invention usually contains 3,4′,5-tribromosalicylanilide as the predominant single constituent. Unreacted salicylanilide is usually removed in the washing step, but trace amounts may be present.

Mixtures produced by the process of this invention are useful because of their bacteriostatic properties. The mixtures of this invention are particularly useful as sources of pure 3,4′,5-tribromosalicylanilide.

The process of the present invention may be more easily understood in light of the following examples which are set forth to illustrate, and are not to be construed to limit, this invention.

*Example 1*

A slurry was prepared by adding with stirring, 0.4 mole of salicylanilide to a mixture of 300 milliliters of chlorobenzene and 65 milliliters of ethanol. At a slurry temperature of about 70 degrees centigrade, 1.25 moles of bromine were added thereto. After addition of the bromine to the slurry, the temperature of the thus formed reaction mixture was maintained at about 70 degrees centigrade, for about four hours. At the end of this time, the mixture was cooled to 25 degrees centigrade and filtered.

The solids left after filtration were then washed twice with 100 milliliter portions of chlorobenzene, and four times with 100 milliliter portions of water. After washing, the solid product was dried at 85 degrees centigrade. A yield of 93.5 percent was obtained, the product having the following analysis:

| | Percent |
|---|---|
| 3,4',5-tribromosalicylanilide | 96.5 |
| 4',5-dibromosalicylanilide | 3.5 |

*Example 2*

To a mixture containing 186.2 grams chlorobenzene and 57.3 grams salicylanilide was added 38.8 grams of ethanol. At a mixture temperature of 70 degrees centigrade, 158 grams of bromine were added thereto. After addition of bromine, the temperature of the thus formed reaction mixture was maintained at about 70 degrees centigrade for about five hours. At the end of the time, the mixture was cooled to 25 degrees centigrade and filtered. The solids left after filtration were then washed twice with 100 milliliter portions of chlorobenzene and four times with 100 milliliter portions of water. After washing, the solid product was dried at 85 degrees centigrade. A yield of 84.4 percent was obtained, the product having the following analysis:

| | Percent |
|---|---|
| 3,4',5-tribromosalicylanilide | 97.5 |
| 4',5-dibromosalicylanilide | 2.5 |

*Example 3*

Using substantially the same procedure as outlined in Examples 1 and 2, 0.4 mole of salicylanilide was brominated with 1.25 moles of bromine in a reaction medium of 333 grams of chlorobenzene and 50 grams of ethanol to give a product having the following analysis:

| | Percent |
|---|---|
| 3,4',5-tribromosalicylanilide | 99+ |
| 4',5-dibromosalicylanilide | <1 |
| 3,5-dibromosalicylanilide | <1 |

*Example 4*

Using substantially the same procedure as outlined in Examples 1 and 2, but with a reaction medium of 167 grams chlorobenzene, 50 grams ethanol, and 150 grams of water, 0.2 mole of salicylanilide was brominated with 0.63 mole of bromine. The resulting product had the following analysis:

| | Percent |
|---|---|
| 3,4',5-tribromosalicylanilide | 99 |
| 4',5-dibromosalicylanilide | 1 |

*Example 5*

Using substantially the same procedure as outlined in Examples 1 and 2, but in reaction media of chlorobenzene and methanol, and chlorobenzene and n-butanol, salicylanilide was brominated to give the product mixtures as here tabulated:

| | Reaction Medium Used, Percent | |
|---|---|---|
| | Chlorobenzene-methanol | Chlorobenzene-n-butanol |
| 3,4',5-tribromosalicylanilide | 98 | 99 |
| 4',5-dibromosalicylanilide | 2 | 1 |

*Example 6*

Using substantially the same procedure as outlined in Examples 1 and 2, a series of experiments were carried out substituting benzene, and o-dichlorobenzene for chlorobenzene. Ethanol was the alkanol used. The results of these brominations are here tabulated:

| | Aromatic Hydrocarbon, Percent | |
|---|---|---|
| | Benzene | o-Dichlorobenzene |
| 3,4',5-tribromosalicylanilide | 98 | 98 |
| 4',5-dibromosalicylanilide | 2 | 2 |
| 3,5-dibromosalicylanilide | trace | trace |

*Example 7*

As a control, an experiment was run using only benzene as the reaction medium. No alkanol was present. In this experiment, 0.4 gram mole of salicylanilide was brominated in 600 milliliters of benzene with 1.27 gram moles of bromine. After washing and drying the product mixture had the following analysis:

| | Percent |
|---|---|
| 3,4',5-tribromosalicylanilide | 78 |
| 4',5-dibromosalicylanilide | 21+ |
| 3,5-dibromosalicylanilide | 0.1 |

*Example 8*

Using substantially the same procedure as outlined in Examples 1 and 2, 0.4 mole of salicylanilide was brominated with 1.25 moles of bromine in a reaction medium of 200 grams of ethanol, 80 grams of chlorobenzene and 120 grams of water to give a product having the following analysis:

| | Percent |
|---|---|
| 3,4',5-tribromosalicylanilide | 91.5 |
| 4',5-dibromosalicylanilide | 0.39 |
| 3,5-dibromosalicylanilide | 8.11 |

*Example 9*

Using substantially the same procedure of Examples 1 and 2, 0.4 mole of salicylanilide was brominated with 1.25 moles of bromine in a reaction medium of 240 grams of ethanol, 80 grams of chlorobenzene and 80 grams of water to give a product having the following analysis:

| | Percent |
|---|---|
| 3,4',5-tribromosalicylanilide | 92.5 |
| 4',5-dibromosalicylanilide | 0.24 |
| 3,5-dibromosalicylanilide | 7.26 |

*Example 10*

Using substantially the same procedure of Examples 1 and 2, 0.4 mole of salicylanilide was brominated with 1.2 moles of bromine in a reaction medium of 100 grams of ethanol, 200 grams of chlorobenzene and 112 grams of water to give a product having the following analysis:

| | Percent |
|---|---|
| 3,4',5-tribromosalicylanilide | 96.0 |
| 4',5-dibromosalicylanilide | 0.25 |
| 3,5-dibromosalicylanilide | 3.75 |

*Example 11*

Using substantially the same procedure of Examples 1 and 2, 0.2 mole of salicylanilide was brominated with 0.63 mole of bromine in a reaction medium of 50 grams of ethanol, 167 grams of chlorobenzene and 150 grams of water to give a product having the following analysis:

| | Percent |
|---|---|
| 3,4',5-tribromosalicylanilide | 99.0 |
| 4',5-dibromosalicylanilide | 0.27 |
| 3,5-dibromosalicylanilide | 0.73 |

*Example 12*

Using substantially the same procedure of Examples 1 and 2, 0.4 mole of salicylanilide was brominated with 1.25 moles of bromine in a reaction medium of 140 grams of ethanol, 333 grams of chlorobenzene and 140 grams of water to give a product having the following analysis:

| | Percent |
|---|---|
| 3,4′,5-tribromosalicylanilide | 96.5 |
| 4′,5-dibromosalicylanilide | 0.13 |
| 3,5-dibromosalicylanilide | 3.37 |

*Example 13*

Using substantially the same procedures as outlined in Examples 1 and 2, propanol, iso-propanol, iso-butanol, sec-butanol, tert-butanol or mixtures thereof may be employed as the alkanol constituent of the reaction medium with benzene, chlorobenzene, o-dichlorobenzene, or mixtures thereof with product mixtures substantially similar to those obtained in Examples 1–6 and 8–12.

Various modifications may be made in the present invention without departing from the spirit or scope thereof, and it is to be understood that I limit myself only as defined in the appended claims.

I claim:

1. In a method of preparing a mixture of bromination products of salicylanilide rich in 3,4′,5-tribromosalicylanilide wherein salicylanilide is contacted with bromine in a reaction medium whereby bromination is accomplished, the improvement which comprises providing as the reaction medium a mixture consisting essentially of (A) a material selected from the group consisting of benzene, chlorobenzene, ortho dichlorobenzene, and mixtures thereof, and (B) an alkanol containing from 1 to 4 carbon atoms, and mixtures thereof, said (A) and (B) being present in a weight ratio of from about 0.3 to about 10 to one.

2. In a method of preparing a mixture of bromination products of salicylanilide rich in 3,4′,5-tribromosalicylanilide wherein salicylanilide is contacted with bromine in a reaction medium whereby bromination is accomplished, the improvement which comprises providing as the reaction medium a mixture consisting essentially of (A) a material selected from the group consisting of benzene, chlorobenzene, ortho dichlorobenzene and mixtures thereof, and (B) an alkanol containing from 1 to 4 carbon atoms, and mixtures thereof, said (A) and (B) being present in a weight ratio of from about three to about ten to one.

3. In a method of preparing a mixture of bromination products of salicylanilide rich in 3,4′,5-tribromosalicylanilide wherein salicylanilide is contacted with bromine in a reaction medium whereby bromination is accomplished, the improvement which comprises providing as the reaction medium a mixture consisting essentially of (A) a material selected from the group consisting of benzene, chlorobenzene, ortho dichlorobenzene, and mixtures thereof, and (B) an alkanol containing from 1 to 4 carbon atoms, and mixtures thereof, said (A) and (B) being present in a weight ratio of from about four to about eight to one.

4. In a method of preparing a mixture of bromination products of salicylanilide rich in 3,4′,5-tribromosalicylanilide wherein salicylanilide is contacted with bromine in a reaction medium whereby bromination is accomplished, the improvement which comprises providing as the reaction medium a mixture consisting essentially of (A) a material selected from the group consisting of benzene, chlorobenzene, orthodichlorobenzene, and mixtures thereof, and (B) an alkanol containing from 1 to 4 carbon atoms, and mixtures thereof, said (A) and (B) being present in a weight ratio of from about 0.3 to about 3 to one.

5. In a method of preparing a mixture of bromination products of salicylanilide rich in 3,4′,5-tribromosalicylanilide wherein salicylanilide is contacted with bromine in a reaction medium whereby bromination is accomplished, the improvement which comprises providing as the reaction medium a mixture consisting essentially of of (A) a material selected from the group consisting of benzene, chlorobenzene, ortho dichlorobenzene, and mixtures thereof, and (B) an alkanol containing from 1 to 4 carbon atoms, and mixtures thereof, said (A) and (B) being present in a weight ratio of from about one to about three to one.

6. In a method of producing a mixture of bromination products of salicylanilide rich in 3,4′,5-tribromosalicylanilide wherein salicylanilide is contacted with bromine in a reaction medium whereby bromination is accomplished, the improvement which comprises providing as a reaction medium a mixture consisting essentially of (A) benzene, and (B) an alkanol containing from 1 to 4 carbon atoms, and mixtures thereof, said (A) and (B) being present in a weight ratio of from about three to about ten to one.

7. In a method of producing a mixture of bromination products of salicylanilide rich in 3,4′,5-tribromosalicylanilide wherein salicylanilide is contacted with bromine in a reaction medium whereby bromination is accomplished, the improvement which comprises providing as the reaction medium a mixture consisting essentially of (A) chlorobenzene, and (B) an alkanol containing from 1 to 4 carbon atoms, and mixtures thereof, said (A) and (B) being present in a weight ratio of from about three to about ten to one.

8. In a method of producing a mixture of bromination products of salicylanilide rich in 3,4′,5-tribromosalicylanilide wherein salicylanilide is contacted with bromine in a reaction medium whereby bromination is accomplished, the improvement which comprises providing as a reaction medium a mixture consisting essentially of (A) ortho dichlorobenzene, and (B) an alkanol containing from 1 to 4 carbon atoms, and mixtures thereof, said (A) and (B) being present in a weight ratio of from about three to about ten to one.

9. In a method of preparing a mixture of bromination products of salicylanilide rich in 3,4′,5-tribromosalicylanilide wherein salicylanilide is contacted with bromine in a reaction medium whereby bromination is accomplished, the improvement which comprises providing as the reaction medium a mixture consisting essentially of (A) chlorobenzene and (B) an alkanol containing from 1 to 4 carbon atoms, and mixtures thereof, said (A) and (B) being present in a weight ratio of from about 0.3 to about 3 to one.

10. In a method of preparing a mixture of bromination products of salicylanilide rich in 3,4′,5-tribromosalicylanilide wherein salicylanilide is contacted with bromine in a reaction medium whereby bromination is accomplished, the improvement which comprises providing as the reaction medium a mixture consisting essentially of (A) chlorobenzene and (B) an alkanol containing from 1 to 4 carbon atoms, and mixtures thereof, said (A) and (B) being present in a weight ratio of from about one to about three to one.

References Cited by the Examiner

UNITED STATES PATENTS 2,997,502  8/1961  Mattson _____ 260—559

WALTER A. MODANCE, *Primary Examiner.*